Patented Jan. 5, 1926.

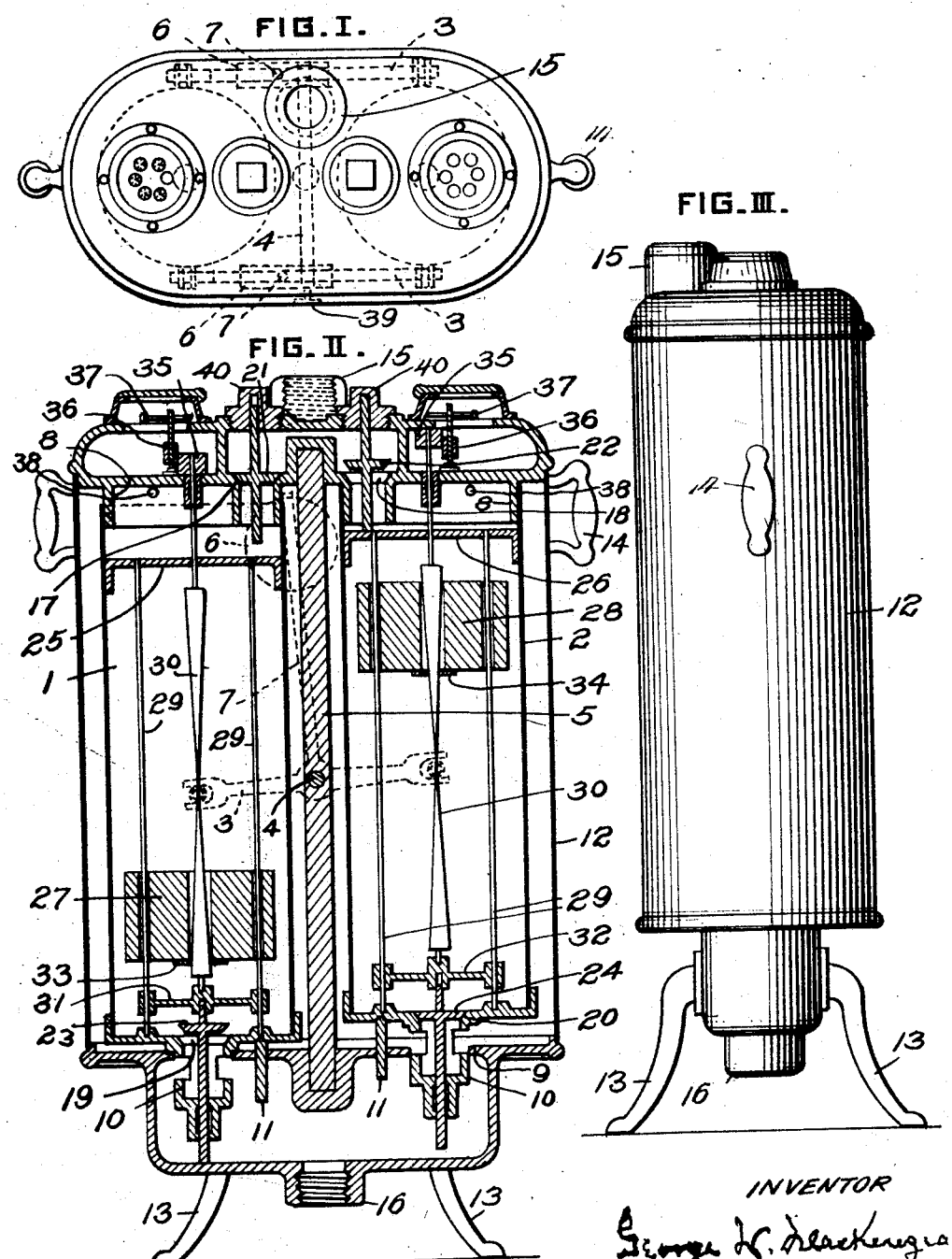

1,568,517

UNITED STATES PATENT OFFICE.

GEORGE W. MacKENZIE, OF BEAVER, PENNSYLVANIA.

LIQUID-MEASURING APPARATUS.

Application filed August 10, 1921. Serial No. 491,114.

*To all whom it may concern:*

Be it known that I, GEORGE W. MACKENZIE, residing at Beaver, in the county of Beaver and State of Pennsylvania, a citizen of the United States, have invented or discovered certain new and useful Improvements in Liquid-Measuring Apparatus, of which improvements the following is a specification.

My invention relates to improvements in apparatus for measuring liquor as it flows by gravity or under pressure from a source of supply to a point of delivery. It is applicable to apparatus for measuring liquid of any sort under the general conditions named, but I have made particular application of it to the measurement of gasoline. And, in dealing with gasoline, apparatus embodying my invention may be used at filling stations and garages, as a curb measuring device for gasoline as it flows from the storage tank at the supply station to the tank of a purchaser's automobile, or it may be used in measuring gasoline as it flows from a tank car on a railway to a tank wagon, or from a tank wagon to the storage tank of a service station, or elsewhere. I shall show and describe the invention applied to apparatus suitable for measuring gasoline as it flows from a tank wagon to the storage tank of a service station, and it will be understood from what has been said that this showing and description are exemplary, and that the invention is not limited to details, suiting the apparatus to this particular service.

In the accompanying drawings Fig. I is a plan view from above, of apparatus particularly designed for measuring gasoline and in which my invention is embodied; Fig. II is a view of this apparatus in vertical section; and Fig. III is a view of it in side elevation.

My invention involves the use of a well-known contrivance which, for lack of a better term, I shall call an oscillating liquid balance. This liquid balance consists essentially of two buckets borne in counterbalance on the opposite arms of a walking beam; the buckets are so arranged that each when elevated will hold liquid, when lowered will be incapable of holding liquid, but liquid previously contained will escape from it. Liquid is supplied from above, to that one of the two buckets which is elevated; while the opposite bucket, being then in lowered position, is empty or in course of emptying. As the upper bucket fills, its weight preponderates and the beam swings, the newly filled bucket descends and the opposite and now empty bucket rises. As the beam swings the liquid supply ceases to enter the newly descended full bucket and begins to enter the newly risen empty bucket. At the same time that this comes about, the newly descended bucket comes to such position that its load of liquid escapes from it. Then, when the bucket which originally was the lower and which now has become the upper bucket fills and the opposite bucket, now the lower, has emptied, the return oscillation is accomplished by gravity.

My invention involves the adaptation of this old liquid balance to service conditions, and consists further in the provision of means for measuring the liquid as it escapes from one and the other of the two buckets, in turn.

Referring to the drawings, two buckets 1 and 2 are shown, borne on opposite arms of a pair of beams 3 pivoted on a shaft 4, the shaft in turn being carried in a suitable support, in this instance a post 5. The buckets are hung as shown on trunnions, to the end that as the beams swing they may rise and descend in substantially true vertical position. Weights 6 borne on arms 7 extending perpendicularly from beams 3 at the pivot point insure bucket-filling to the desired maximum before oscillation. Guides for the reciprocating buckets are found in the stationary cylindrical members 8 upon which the buckets at their upper rims move telescopically, and the ported plate 9 through which central cylindrical bosses 10 on the bottoms of the buckets extend. These bosses 10 are of skeleton form, that is to say they are ported in their cylindrical walls for the free passage of fluid. Eccentrically placed pins 11 extending vertically from the bottoms of the buckets through guide openings in plate 9 hold the buckets from rotation on their axes.

Post 5, guide members 8, and plate 9 are all carried by a casing which includes a shell 12, and which encloses the whole. The present apparatus being intended for service of the nature indicated, the casing is provided with feet 13 and with handles 14.

Within the casing above and below the buckets are arranged chambers for incoming and outgoing liquid; to the one an inlet tap 15 opens, from the other an outlet tap 16 leads.

In the bottom of the upper chamber, and in line with and above the two buckets are formed openings 17 and 18; in the bottoms of the buckets are formed openings 19 and 20. The openings in the bottoms of the buckets may conveniently lead through bosses 10, and thus suitable guidance may readily be afforded for valves, presently to be described. These four openings are controlled by poppet valves 21, 22, 23, and 24. Valves 21 and 22 are carried by the casing, and seat downwardly and in the direction of flow; valves 23 and 24 are carried by the buckets, and they also seat downwardly and in the direction of flow. Valves 21 and 22 are opened alternately on the rise of one of the buckets, by abutment of one or the other of bridge members 25 and 26 which extend across the buckets with the end of the downwardly prolonged valve stem; valves 23 and 24 are opened alternately on the descent of one or the other of the buckets by abutment of the downwardly prolonged valve stem upon the bottom of the casing.

Operation of the apparatus as thus far described is as follows, particular reference being had to Fig. II. The source of gasoline supply, as for example a tank wagon, is connected by a hose with inlet tap 15, and another hose connection is made from outlet tap 16 to the place of delivery, as for example the storage tank of a service station. Under such conditions the flow is ordinarily by gravity. The parts being in the position shown, gasoline entering at 15 is flowing through port 18 into the right-hand bucket, 2; at the same time gasoline previously contained in the left-hand bucket, 1, is flowing out through port 19 to the outlet 16. This condition obtains until the excessive weight of bucket 2 over bucket 1 overcomes the gravity of weights 6, then exerted in opposition to the descent of bucket 2. When this change in weight has come about beams 3 swing, bucket 2 descends and bucket 1 rises. As this occurs the gravity of weights 6 is shifted and exerted now to sustain bucket 1 in elevated position. When the relative positions of the two buckets so change, the valves are reversed, and empty bucket 1 begins to be filled, while full bucket 2 begins to empty. This filling and emptying continues until the weight of bucket 1 so far exceeds that of bucket 2 that the gravity of weights 6 is again overcome, whereupon the beams swing again, and the parts return to the position shown in Fig. II. Thus as the gasoline flows it is carried alternately by one bucket or the other, and the periodic oscillation of the buckets takes place.

It remains to describe the measuring apparatus.

In the two buckets there are two floats 27 and 28 which rise and descend within the buckets as the buckets fill and empty. The floats are restrained from turning by being threaded on rods 29 extending vertically through the buckets, from the bridges 25 and 26 at the upper ends to the bottoms of the buckets. Extending centrally through the two buckets, and protruding through packing glands into the liquid chamber above are duplicate spindles, 30, 30. These spindles are mounted to revolve, and, to that end, their lower ends are seated in suitable bearings in bridge pieces 31 and 32 arranged one in each bucket near the bottom. These bridge pieces incidentally may be provided with guide openings for the stems of valves 23 and 24, as shown. The spindles 30 are throughout their intermediate portions made flat and spiral in shape, and the material chosen and the proportions are such that these spiral spindles are practically rigid, and move each as an entity. The spindles extend through the floats. The floats are provided with slotted plates 33 and 34 which throughout the extent of relative movement engage the flattened and spiral portions of spindles 30 with such closeness that, while permitting of relative longitudinal movement, they do not permit of relative rotary movement of spindle within slot. The consequence and effect is that as floats 27 and 28 rise and descend spindles 30 rotate on their axes, first in one direction and then in the other.

Spindles 30 carry at their upper ends spur gears 35, and these mesh with spur gears 36 of tally registers 37. The engaging gears 35 and 36 are sufficiently elongated as to remain always in mesh, throughout the range of longitudinal movement of gears 35, incident to the rise and descent of the buckets which carry them. The tally registers may have ratchet escapements, to the end that, while the turning of gear 36 in one direction (that brought about by the descent of a float) will operate the tally, turning in opposite direction will not be imparted to the tally index finger or equivalent device.

The oscillation of the buckets 1 and 2 has been explained. Incidentally it has appeared that each bucket is alternately filled and emptied, and that as one bucket fills the other empties. Filling and emptying effect rise and descent of floats 27 and 28 and attendant rotation of spindles 30. The retrograde rotations, effected by the rise of the floats is lost in the ratchet escapement, and may be disregarded. The forward rotations, effected by the descent of the floats are important. In the progress of operation first one spindle and then the other is forwardly rotated, and accordingly first one tally and then the other registers the descent of a float and the extent of movement of the tally register is an index of the range of float descent. It appears, then, that while the oscillation of the beams 3 is effected by weight the measurement of the gasoline is not by weight but by volume. The mere recording of the number of oscillations of the beams 3 would be an index of the amount of gasoline delivered, but it would be an index of weight. Gasoline varies in specific gravity, but it is sold by volume. My apparatus affords accurate volumetric measurement. As the specific gravity of the gasoline varies the range of rise and fall of floats 27 and 28 will vary, but always the record will be an accurate volumetric record.

The buckets being truly cylindrical it will be understood that every inch of downward movement of the float is an accurate indication of volume. Conveniently the pitch of the spiral is so proportioned to the diameter of the bucket that one half turn of the spiral records one gallon escaping from the bucket. And further the ratio of gears 35 to 36 is as 2 to 1, to the end that one complete rotation of the shaft of the tally means 1 gallon of gasoline delivered.

Breathing holes 38 may be provided through guide member 8, to facilitate rise and fall of the buckets. A rotary valve, indicated at 39 in Fig. I, may control an air-hole through the casing. This valve may be operated by shaft 4, the arrangement being such that when the beams 3 are in horizontal position the valve will be closed, but, as the beams 3 move from horizontal position in either direction, the valve will be opened. It will be understood that when the beams 3 extend in horizontal position all valves are closed. Hand holes with suitable closures 40 may be provided, affording ready access to valves 21 and 22, and in them guide ways for the valve stems may be formed, as shown.

My only reason for providing two tallies and connecting the two spindles 30 each with its own tally is that such an arrangement minimizes the amount of transmission gearing requisite, and gives the simplest possible apparatus.

Materials and proportions are such as may be found advantageous. Brass, for example, may be used in the formation of the buckets and the shell; the end structures above and below may, for the sake of lightness, be made of cast aluminum; the post 5 and the beams 3 of steel. The floats will be of such material as will resist gasoline penetration. They may, for example, be formed of cork, or of balsam wood, suitably treated and coated, or they may be hollow brass shells. The openings through them may be provided with suitable bushings, ordinarily of brass. The bottom plates for the floats, in which the slots 33 and 34 are formed, will ordinarily be brass plates. It will be remarked of the floats that, even though they become more or less waterlogged, so long as the specific gravity continues less than that of gasoline, they will still rise and fall with the filling and emptying of the buckets, and the rise and fall will be a true volumetric index of gasoline delivery. It should further be remarked that frictional variations in the bearing of the slot in the float upon the spiral surface of the spindle will not affect the accuracy of the measurement. The float makes its travel, and, whether the transmission be with greater or less friction, the travel of the measuring apparatus will be the same for a given float movement. The weights 6 may of course be adjustable, and by adjustment effect with nicety the weight of gasoline introduced to and withdrawn from the bucket with each reciprocation.

The range of bucket oscillation may be, say three quarters of an inch; of valve reciprocation, three eighths of an inch.

The apparatus in its details is exemplary of the invention, but the invention is not limited to details.

I claim as my invention:

1. In liquid-measuring apparatus, the combination, with an oscillating liquid balance, including a bucket borne in counterpoise and having a bottom discharge, of a float in said bucket, and means for measuring the range of the movement of the float in its descent.

2. In liquid-measuring apparatus, the combination, with an oscillating liquid balance, including a bucket borne in counterpoise and having a bottom discharge opening and a valve in said opening, of a spindle extending vertically within said bucket, a float within said bucket, one of said members (float and spindle) being provided with a spirally disposed surface upon which the other makes engagement, means for holding one of said members (float and spindle) against rotation, an indicator, and means for imparting to said indicator the relative rotary movement of float and spindle incident to vertical movement of the float within the bucket, substantially as described.

3. In liquid-measuring apparatus, the combination, with an oscillating liquid balance, including a bucket borne in counterpoise and having a bottom discharge, of a float in said bucket, a spindle borne by said bucket and extending longitudinally thereof and rotatable in its bearing, said spindle being provided with a spiral surface, said float engaging said spindle upon the spiral surface thereof, and an indicator operated by rotation of said spindle, substantially as described.

4. In liquid-measuring apparatus, the combination, with an oscillating liquid balance, including a bucket borne in counterpoise and having a bottom discharge, of a float in said bucket provided with a central perforation extending when the parts are assembled longitudinally of the bucket, said central perforation being provided with an orifice having opposite parallel lips, a spindle rotatably borne by said bucket extending longitudinally of the bucket and shaped to the form of a helical ribbon, such spindle so formed extending through the perforation in the float and through the orifice therein, and an indicator driven by rotation of the spindle.

5. In liquid-measuring apparatus, a receiving chamber having a liquid inlet port, a pivoted member, a pair of buckets borne in counterbalance upon said pivoted member and oscillatory beneath said chamber, said receiving chamber being additionally provided with ports opening through its bottom and arranged one above each of said buckets, said buckets having each a port in its bottom, downwardly closing valves controlling both the ports in the bottom openings of the inlet chamber and the ports in the bucket bottom, means whereby bucket rise unseats the valve in the inlet chamber port above, means whereby bucket descent unseats the valve in the bucket bottom, and means for measuring volumetrically the liquid as it escapes from the bucket.

6. In liquid-measuring apparatus, a casing provided with upper and lower chambers, means for introducing a flow of liquid to the upper chamber, means for allowing liquid to escape from the lower chamber, a pivoted member, a pair of buckets counterbalanced upon said pivoted member and oscillatory in the space between said chambers, said upper chamber being provided with bottom ports arranged one above each of said buckets, each bucket being provided with a bottom port, valves controlling the ports in the inlet chamber above and in the bucket bottoms below, means for unseating the valves by bucket oscillation, and means for measuring volumetrically liquid escaping from a bucket.

7. In apparatus for measuring volumetrically a quantity of liquid as it flows in a stream, the combination of two vessels, means for causing successive quantities of liquid segregated by weight to enter first one and then the other of the two vessels, alternately, and for causing the previously received liquid to flow from the vessels alternately, one vessel emptying as the other fills, a float in each vessel, an indicator, and means for imparting movement from float to indicator, substantially as described.

8. In liquid-measuring apparatus, the combination of an inlet chamber provided with a bottom opening, a downwardly-closing valve in said opening, a vertically oscillatory bucket borne in counterpoise beneath said opening in the bottom of the inlet chamber, said bucket being provided with a bottom opening, a downwardly closing valve in the opening last named, means whereby the rising bucket unseats the valve in the bottom opening of the inlet chamber, means whereby descent of the bucket effects unseating of the valve in the bottom of the bucket, and means for indicating quantitatively the escape of liquid from the bucket.

In testimony whereof I have hereunto set my hand.

GEORGE W. MACKENZIE.